US011104592B2

(12) United States Patent
Aboud et al.

(10) Patent No.: US 11,104,592 B2
(45) Date of Patent: Aug. 31, 2021

(54) WATER TREATMENT SYSTEM

(71) Applicant: Creative Water Solutions, LLC, Jacksonville, FL (US)

(72) Inventors: Richard Aboud, Jacksonville, FL (US); Jon Dinges, Tallahassee, FL (US); Edmund Kobylinski, Overland Park, KS (US)

(73) Assignee: CREATIVE WATER SOLUTIONS, LLC, Jacksonville, FL (US)

( * ) Notice: Subject to any disclaimer, the term of this patent is extended or adjusted under 35 U.S.C. 154(b) by 215 days.

(21) Appl. No.: 16/415,427

(22) Filed: May 17, 2019

(65) Prior Publication Data
US 2019/0352197 A1 Nov. 21, 2019

Related U.S. Application Data

(60) Provisional application No. 62/673,569, filed on May 18, 2018.

(51) Int. Cl.
*C02F 1/40* (2006.01)
*C02F 1/46* (2006.01)
(Continued)

(52) U.S. Cl.
CPC ............... *C02F 1/40* (2013.01); *C02F 1/001* (2013.01); *C02F 1/463* (2013.01); *C02F 9/00* (2013.01);
(Continued)

(58) Field of Classification Search
CPC .. C02F 1/40; C02F 1/463; C02F 1/001; C02F 9/00; C02F 2301/08; C02F 2001/007;
(Continued)

(56) References Cited

U.S. PATENT DOCUMENTS

2011/0233136 A1* 9/2011 Enos .................. C02F 9/00
210/631
2013/0126174 A1 5/2013 Henson et al.
(Continued)

FOREIGN PATENT DOCUMENTS

JP 2016511693 4/2016
KR 100943987 3/2010

OTHER PUBLICATIONS

International Search Report and Written Opinion; Corresponding PCT Application Serial No. PCT/US2019/032846; Authorized Officer Min, In Gyou; dated Sep. 25, 2019.

*Primary Examiner* — Fred Prince
(74) *Attorney, Agent, or Firm* — Squire Patton Boggs (US) LLP

(57) ABSTRACT

A water treatment system includes an influent tank that screens influent and skims oil from wastewater, and an open aeration tank that draws wastewater from the influent tank. The system also includes an electro-coagulation unit that provides an electrical charge to water exiting the open aeration tank and a dissolved air flotation tank that receives water exiting the electro-coagulation unit. The system further includes a sedimentation tank that receives water exiting the dissolved air flotation tank, and a first set of filters that removes pollutants from water exiting the sedimentation tank. The system also has a sedimentation and recirculation tank that removes pollutants from water exiting the first set of filters.

20 Claims, 3 Drawing Sheets

(51) Int. Cl.
*C02F 1/00* (2006.01)
*C02F 9/00* (2006.01)
*C02F 1/463* (2006.01)
*C02F 101/32* (2006.01)

(52) U.S. Cl.
CPC .... *C02F 2001/007* (2013.01); *C02F 2101/32* (2013.01); *C02F 2201/002* (2013.01); *C02F 2301/08* (2013.01)

(58) Field of Classification Search
CPC .. C02F 2101/32; C02F 2201/002; C02F 1/24; C02F 1/74; C02F 1/444; C02F 2201/008; C02F 1/66
USPC .............................. 210/748.01, 776, 252, 259
See application file for complete search history.

(56) References Cited

U.S. PATENT DOCUMENTS

| | | |
|---|---|---|
| 2014/0069821 A1 | 3/2014 | Marcin et al. |
| 2014/0158638 A1 | 6/2014 | Caulkins et al. |
| 2018/0002212 A1* | 1/2018 | Englram .................. C02F 9/00 |

* cited by examiner

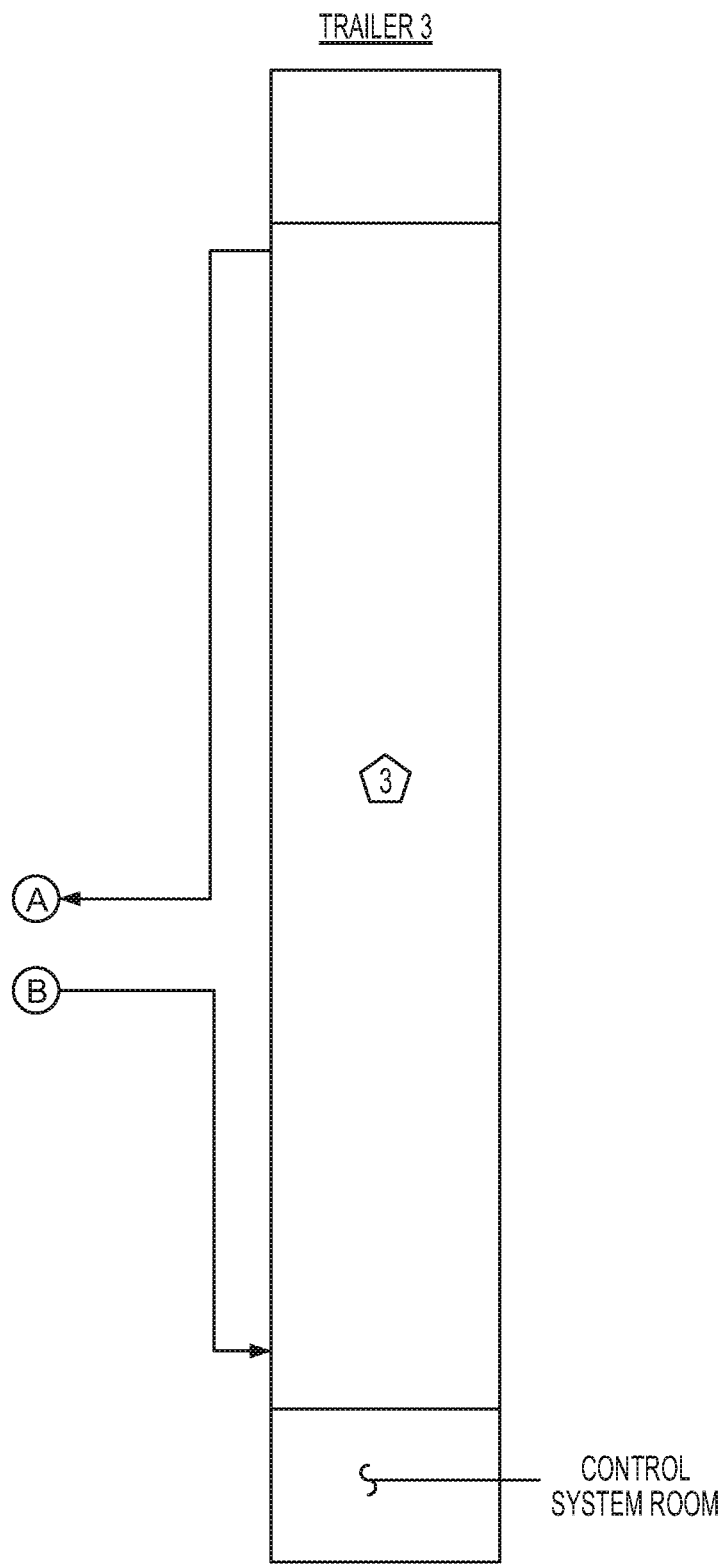
FIG. 2 (Cont...)

WATER TREATMENT SYSTEM

CROSS-REFERENCE TO RELATED APPLICATION

The present disclosure claims the benefit of U.S. Provisional Patent Application No. 62/673,569 filed on May 18, 2018, the disclosure of which is incorporated by reference herein in its entirety.

FIELD OF INVENTION

The present disclosure is related to purification systems for contaminated water. More specifically, the present disclosure is related to purification systems for water used in a hydraulic fracturing ("fracking") operation. Such water may be referred to as "produced water."

BACKGROUND

Historically, water has been treated as an unlimited natural resource usually controlled by governments in most parts of the world. The low price of water coupled with the difficulty in moving water over great distances serves to keep most water use local. As both use and population increase, water resources can reach their natural limit in some areas. Price increases normally follow.

In many parts of the world, water is a critically limiting resource. Water is necessary for urban development (including personal use), agriculture, industry, landscaping, and consumptive uses (oil and natural gas development). In those areas with limited water resources, the competing water uses are often allocated hierarchically. This allocation structure usually places personal use as the top priority and industrial use at the bottom.

Economic growth demands a reliable and cost effective supply of both water and energy. With industrial uses at or near the bottom of the priority list, industry is often left to seek out new ways to decrease water use while also searching for other sources of water such as wells. One of the more difficult problems of current-day governments and society in general is to balance the needs of economic growth and environmental protection. Thus, there is a significant need for water production that benefits economic growth without significantly detracting from the water environment.

Newer terminology labels water use as either consumptive or non-consumptive. Water use is non-consumptive if it is used and then returned to the local environment in some manner. Consumptive water use does not return the water to the environment after use because the water is lost. Two examples of major consumptive water uses are (1) heat rejection as in a cooling tower, and (2) fracking of rock in connection with the production of hydrocarbons.

Fracking operations require millions of gallons of water. Water for fracking is usually purchased from the excess of various local community supplies and then hauled to the drilling location via truck. Typical tanker trucks haul 6,000-8,000 gallons per load. Such methods for obtaining and delivering water are costly and inefficient. Additionally, the amount of truck traffic necessary to deliver so much water from the producer to the fracking site is a large contributor to air pollution and terrain destruction in the areas subjected to the traffic. Since fracking areas are often remote and far from any water purification plants, it would be desirable if a system capable of purifying produced water so that it may again be put to industrial use, such as continued use in a fracking operation.

Fracking requires pumping millions of gallons of water into the ground to open fractures. Of this water, 75% is lost during the fracking operation. In conventional fracking operations, the water is often contaminated with chemicals, which degrades the local ground water. Approximately 25% of the fracking water is recovered as flow-back. However, flow-back water is severely contaminated and recovery is not cost effective at this time, so that it is typically disposed of. If injected back into the ground in shallow wells, it would contaminate drinking water. Thus, it generally is disposed of in lined pits and deep well injection, both of which are costly. Further, loss of ground water on this scale is leading many local and state governments to impose restrictions and moratoriums on the use of water resources for consumptive use. Thus, a method to locally convert produced water to industrial water in an economical manner would be highly desirable.

Existing water treatment systems rely on a prefilter screening to remove large debris from the wastewater, prior to undergoing a treatment step of electro-coagulation. These existing systems are inefficient, because the prefilter often becomes saturated and fails to provide an adequate flow of wastewater into the water treatment system. Thus, a need also exists for a water treatment system that can maintain an optimal water flow while removing large particles from the wastewater.

SUMMARY

In one embodiment, a water treatment system includes a primary tank configured to receive wastewater. The primary tank includes a baffle that intercepts floating oils in the wastewater, and a hopper for collecting particles. The system further includes a secondary tank that receives water from the primary tank. The secondary tank is configured to aerate the water. The system also includes an electro-coagulation unit configured to receive water exiting the secondary tank and generate metal hydroxides in the water. The system also has a tertiary tank that receives water from the electro-coagulation unit. The tertiary tank is configured to separate suspended matter from the water. The system further includes a quaternary tank that receives water from the tertiary tank, and is configured to remove debris from the water. The system also includes a plurality of bag filters that receives water from the quaternary tank. The bag filters are configured to remove pollutants on the order of 1-5 microns. The system further includes a quinary tank that receives water from the plurality of bag filters, and which is configured to settle coagulated solids from the water. The system also includes a microfilter that receives water from the quinary tank. The microfilter is configured to remove pollutants on the order of 0.1-10 microns. The system further includes a senary tank that receives water from the microfilter, which is configured to settle pollutants from the water. The system also has an ultrafilter that receives water from the senary tank.

In another embodiment, a water treatment system includes an influent tank that screens influent and skims oil from wastewater, and an open aeration tank that draws wastewater from the influent tank. The system also includes an electro-coagulation unit that provides an electrical charge to water exiting the open aeration tank and a dissolved air flotation tank that receives water exiting the electro-coagulation unit. The system further includes a sedimentation tank that receives water exiting the dissolved air flotation tank, and a first set of filters that removes pollutants from water exiting the sedimentation tank. The system also has a sedimentation and recirculation tank that removes pollutants from water exiting the first set of filters.

In yet another embodiment, a method for treating wastewater includes the steps of providing wastewater to a primary screening tank and removing large pollutants from the wastewater in the primary screening tank. The method also includes providing water from the primary screening tank to a secondary screening tank and providing water from the secondary screening tank to an electro-coagulation unit. The electro-coagulation unit generates metal hydroxides in the wastewater. The method further includes providing water from the electro-coagulation unit to a third screening tank and providing water from the third screening tank to a fourth screening tank. The method also includes providing water from the fourth screening tank to a first set of filters to remove pollutants from the water and providing water from the first set of filters to a fifth screening tank.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
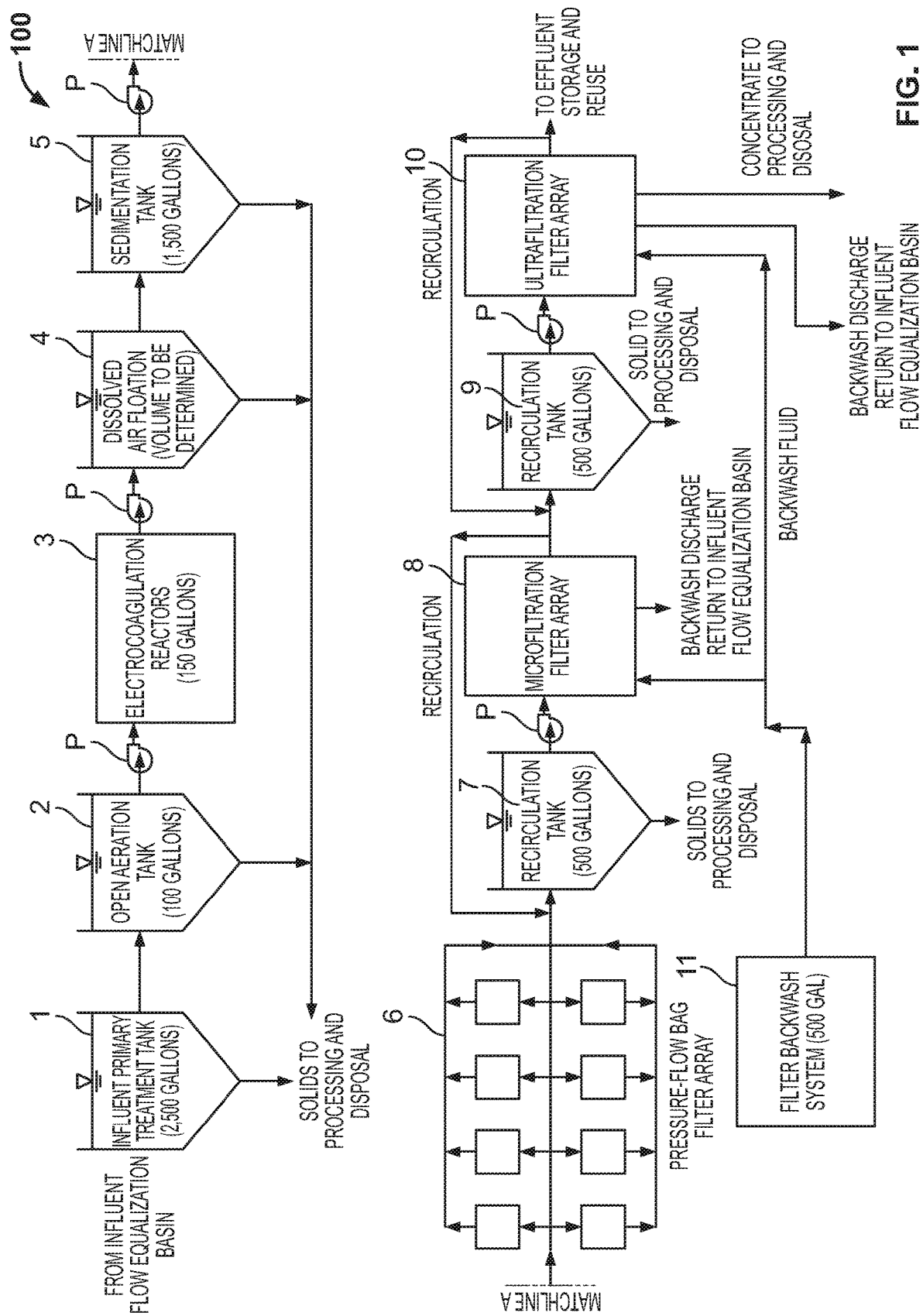
FIG. 1 is a schematic diagram of the water treatment system according to an embodiment of the present disclosure.

FIG. 1 is a diagram of a water treatment system 100 according to an embodiment of the present disclosure. Water treatment system 100 is designed to treat contaminated water, for example, produced water from a fracking operation. The primary pollutants of concern in the wastewater typically consist of such as hydrocarbons, metals, dissolved gases, and salts. Additionally, wastewater is treated to meet other parameters, such as pH, temperature, and conductivity. The water treatment system of the present disclosure is not limited to the aforementioned pollutants, and those of skill in the art will recognize that the water treatment system can be used to remove other types of pollutants as well.

Water treatment system 100 can be implemented as a mobile system, with the components being located on one or more mobile trailers or skids. Alternatively, some portions of the water treatment system 100 can be mobile, while other parts are fixed or located at a work site. Alternatively, all portions of the water treatment system 100 can be fixed or located at the work site. Details of water treatment system 100 are discussed by section below.

Water treatment system 100 includes an influent primary treatment tank 1, which stores untreated wastewater. The influent primary treatment tank 1 also performs influent screening, oil skimming, and primary sedimentation. Such influent screening is required for removal of large particles, floating oil and grease, and settling of grit and sand. The influent primary treatment tank 1 should include a baffle for removing floating oils and a hopper for collection and removal of settled solids.

The influent primary treatment tank 1 can be located at or near a project site where the water treatment system 100 will be implemented. In the illustrated embodiment, the influent primary treatment tank 1 has a capacity of 2,500 gallons and draws water from an influent flow equalization basin. In other embodiments (not shown), the influent primary treatment tank 1 can have a greater or lesser capacity, can be located in-ground, can be a well, or can be a ground reservoir.

An open aeration tank 2 draws wastewater from the influent primary treatment tank 1. Aeration is required to strip excess carbon dioxide from the wastewater flow. Removing excess carbon dioxide will enable easier pH adjustment of the wastewater flow. In the illustrated embodiment, the volume of the open aeration tank 2 is 100 gallons, which will provide one minute of hydraulic detention time. It is anticipated that volatile organic compounds and hydrogen sulfide, if present, will be released in this process. In one embodiment, the open aeration tank 2 is open to the atmosphere to allow for venting of gases. If the tank is located within an enclosed trailer, then positive ventilation to the external atmosphere may be provided to prevent an accumulation of gases within enclosed areas.

The outtake water from the open aeration tank 2 is pumped by a pump P to an electrocoagulation reactor 3. The electrocoagulation reactor 3 initiates flocculation and coagulation of dissolved pollutants for subsequent sedimentation and filtration removal mechanisms. High-strength wastewater may require frequent replacement of electrodes. In the illustrated embodiment, the total reactor volume is approximately 120 to 150 gallons.

In one embodiment, the electrocoagulation reactor includes two parallel-flow electro-coagulation units ("EC units"). EC units reduce the surface charge of pollutant particles and promote coagulation of the particles. The EC units use an electro-chemical process to generate principally iron fe++ (or alternate metal source) and hydroxyl groups which cause several simultaneous chemical and physical interactions with contaminants. Metal hydroxide complexes form, which cause precipitation and flocculation of these inorganic and organic molecules. The process typically involves providing an electrical charge to a set of ferrous electrode plates submerged in the wastewater flow, which creates metal hydroxides within the water that promote particle coagulation. The coagulation of these particles increases the particle mass, allowing gravitational forces to act on the particles for settling and filtering purposes.

In the present embodiment, the EC units are mounted to a skid system, but in other embodiments can be mounted in other locations. In alternative embodiments (not shown), electrode plates could be aluminum or other metallic materials or a combination of different plate materials.

The outtake water from the electrocoagulation reactor 3 is then pumped by a pump P to a dissolved air flotation tank 4. Dissolved air flotation is a unit process used to separate suspended matter from the waste stream. The process uses dissolved air to attach to particulate matter, causing the particulate matter to float to the surface for removal. The principal advantage to flotation over sedimentation is that fine particles that would settle slowly can be removed more completely and in less time, particularly in a waste stream with a specific gravity in the range of 1.04 to 1.14. Dissolved air flotation process performance is typically enhanced with the addition of coagulants to optimize floc growth and air bubble capture. However, in the illustrated embodiment, the dissolved air flotation unit is preceded by electrocoagulation reactors, which initiate coagulation without the addition of coagulants.

After passing through the dissolved air flotation tank 4, the water enters a sedimentation tank 5. The sedimentation tank 5 is configured to remove debris and allow settling of any sand, grit, or other particle having a high specific gravity relative to the other particles filtered downstream in water treatment system 100. The sedimentation tank 5 typically removes non-organic particles.

The wastewater then enters a series of pressure flow bag filters 6, arranged in a combination of both series and parallel flows. In alternative embodiments (not shown), the bag filters can be arranged in only series or only parallel. In the illustrated embodiment, eight bag filters are employed. But it should be understood that any number of bag filters may be used. The bag filters 6 contain fabric media elements with a pore size of about 1 to 5 microns, and pressurized wastewater flows through these filters to remove particles larger than the pore size of the filters.

The bag filters placed within containment vessels are used as a physical filtration process to separate particulate material escaping dissolved air flotation and final sedimentation and prevent fouling of downstream fine filtration processes. Flow will be split between several bag filter units configured in a manifold. Two multi-bag filter vessels may be employed, each with 100 gpm nominal capacity, so one vessel can be in operation while the other undergoes bag replacement, thus maintaining treatment operations during maintenance.

In alternative embodiments (not shown), a pump can pass the wastewater through the bag filters. In alternative embodiments (not shown), filters other than bag filters may be used. A filter may be selected based on the throughput flow rate, the degree of filtration desired, the nature of the contaminated influent stream, or cost considerations. Exemplary cost considerations include the cost of cleaning a filter versus the costs of exchanging a filter.

Examples of other filters that may be used in place of bag filters include, without limitation, "open" filters, where the media in the tank is open to the atmosphere with flow by gravity, "depth" type filters, where particulate collects throughout the volume of a cartridge element, a "strainer", which collects large debris to protect downstream pipes and valves, a "bed" type filter, which uses roll media, and a centrifugal filter, which separates particulate using centrifugal forces.

After the wastewater passes through bag filters 6, the water enters a sedimentation and recirculation tank 7. Sedimentation tanks provide a quiescent environment to settle coagulated solids following bag filtration. These tanks also serve as a recirculation reservoir for the downstream filtration processes. In the illustrated embodiment, the sedimentation and recirculation tanks each have a volume of approximately 500 gallons.

Water exiting the sedimentation and recirculation tank 7 passes through a booster pump P that forces the wastewater through a microfilter 8. The booster pump further increases the pressure of wastewater. Microfilter 8 removes particles typically sized from 0.1 to 10 microns. Microfilters 8 collect particulate throughout the volume of the filter elements. Microfilters 8 typically operate at considerable pressure difference between the input and product streams. Microfilters 8 have two output streams, including the product stream and a larger through-flow stream that can be recycled or carried to other processes.

Another sedimentation and recirculation tank 9 receives the product stream water exiting microfilter 8. Water in the sedimentation and recirculation tank 9 undergoes a final settling phase prior to moving downstream, and pollutants in the wastewater settle in the bottom of the sedimentation and recirculation tank 9 while wastewater is resident in this tank. In one embodiment, the volume of the sedimentation and recirculation tank 9 is about 500 gallons.

After the wastewater exits the sedimentation and recirculation tank 9, a booster pump P passes the wastewater on to ultrafilters 10. A booster pump may further increase the pressure of water entering ultrafilters 10.

The water treatment system 100 further includes a backwash system 11 for implementing a cleaning process in microfilters and ultrafilters. Periodically, the microfilters and ultrafilters must receive a backwash treatment to maintain proper function.

A backwash cleaning procedure begins by isolating the filter or filters from the process, depressurizing the filters and draining them. The filters are then backflushed with clean (treated) water from the backwash system 11, and the clean water is permitted to dwell within the filters for a set time. The backwash fluid may contain certain chemicals to promote filter cleaning.

All of the sedimentation and recirculation tanks further include a valve and drain for removing solids that accumulate in the bottom of the tanks during the settling process. The drains lead to a manifold pipe, which transfers the solids to discharge drum. The solid waste can then be removed from discharge drum and tested as needed prior to disposal. In alternative embodiments (not shown), the solids removed from the purified water can be collected and used in other applications.

Figure 2:
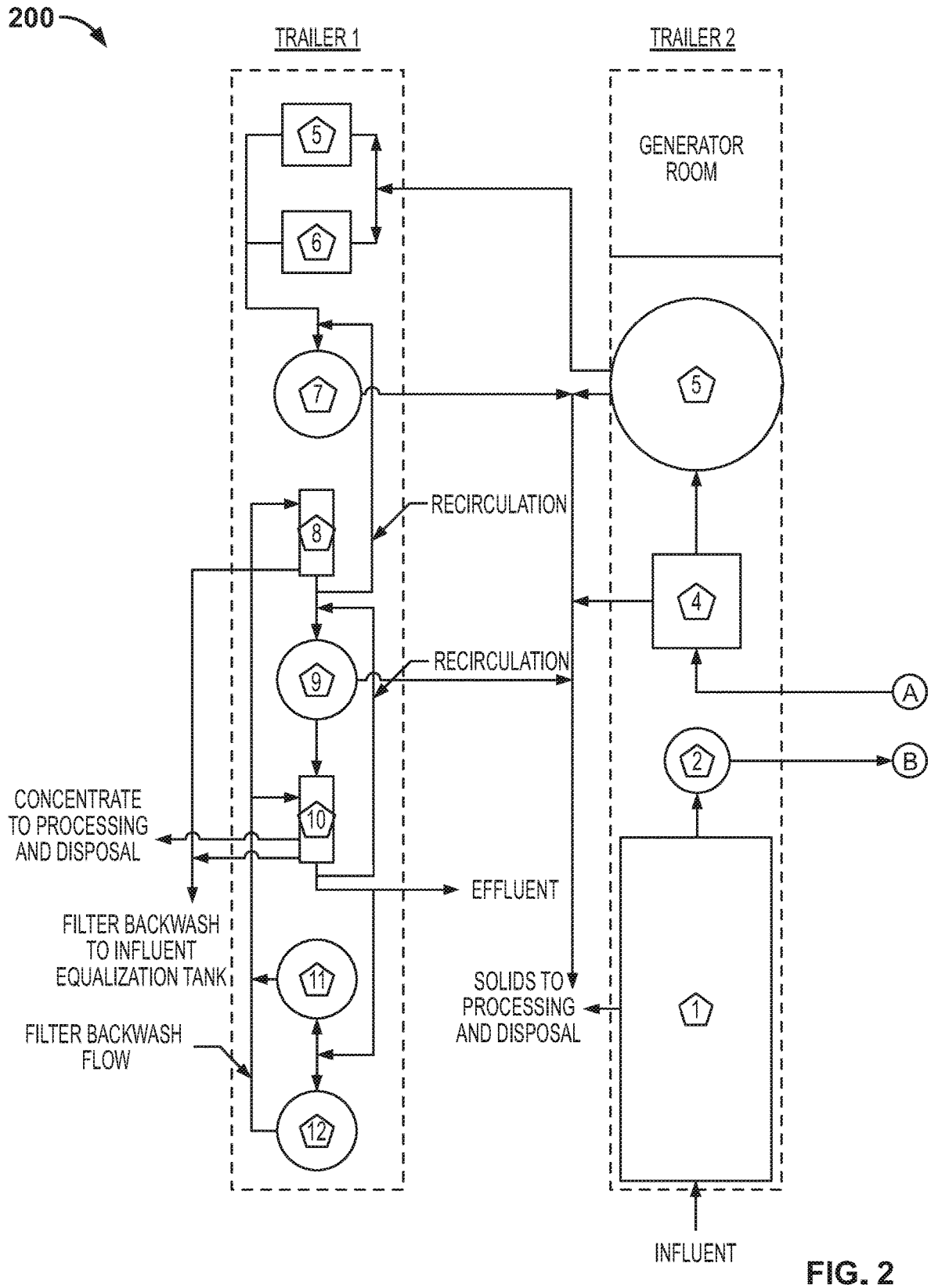
FIG. 2 is a plan-view schematic of the embodiment shown in FIG. 1.

FIG. 2 illustrates a plan-view schematic of water treatment system 200, in an installation. The system 200 is depicted as a modular system, with certain components located on skids. Thus, some components may be partially assembled on multiple skids at a first location and transported to a second location. The assembly may then be completed at the second location by connecting components on adjacent skids. The system may then be operated for a desired length of time, then disassembled and moved to another location. In this embodiment, the reference numerals in system 200 represent the same components shown in system 100 in FIG. 1. It should be understood that the layout shown in FIG. 2 is merely exemplary, and other layouts may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A water treatment system comprising:
a primary tank configured to receive wastewater,
wherein the primary tank includes a baffle that intercepts floating oils in the wastewater,
wherein the primary tank includes a hopper for collecting particles;
a secondary tank that receives water from the primary tank, the secondary tank configured to aerate the water;
an electro-coagulation unit configured to receive water exiting the secondary tank and generate metal hydroxides in the water;
a tertiary tank that receives water from the electro-coagulation unit, the tertiary tank configured to separate suspended matter from the water;
a quaternary tank that receives water from the tertiary tank, the quaternary tank configured to remove debris from the water;
a plurality of bag filters that receives water from the quaternary tank, the plurality of bag filters configured to remove pollutants on the order of 1-5 microns;
a quinary tank that receives water from the plurality of bag filters, the quinary tank configured to settle coagulated solids from the water;
a microfilter that receives water from the quinary tank, the microfilter configured to remove pollutants on the order of 0.1-10 microns;
a senary tank that receives water from the microfilter, the senary tank configured to settle pollutants from the water; and
an ultrafilter that receives water from the senary tank.

2. The water treatment system of claim 1, further including a backwash system configured to pump a cleaning solution through the microfilter and the ultrafilter, in a direction opposite to a water intake direction.

3. The water treatment system of claim 1, wherein a portion of the water exiting the microfilter is re-circulated to the quinary tank or to a microfilter inlet.

4. The water treatment system of claim 1, wherein a portion of the water exiting the ultrafilter is re-circulated to the senary tank or to an ultrafilter inlet.

5. The water treatment system of claim 1, wherein each of the primary, secondary, tertiary, quaternary, quinary, and senary tanks provide pollutants to a discharge drum.

6. The water treatment system of claim 1, wherein each of the primary, secondary, tertiary, quaternary, quinary, and senary tanks have valves and drains connected to a manifold pipe.

7. The water treatment system of claim 1, further comprising a booster pump configured to pump water from the senary tank to the ultrafilter.

8. The water treatment system of claim 1, wherein the plurality of bag filters contain fabric media elements with a pore size of about 1 to 5 microns.

9. A water treatment system, comprising:
an influent tank that screens influent and skims oil from wastewater;
an open aeration tank that draws wastewater from the influent tank;
an electro-coagulation unit that provides an electrical charge to water exiting the open aeration tank;
a dissolved air flotation tank that receives water exiting the electro-coagulation unit;
a sedimentation tank that receives water exiting the dissolved air flotation tank;
a first set of filters that removes pollutants from water exiting the sedimentation tank; and
a sedimentation and recirculation tank that removes pollutants from water exiting the first set of filters.

10. The water treatment system of claim 9, further comprising a second set of filters that removes pollutants from water exiting the sedimentation and recirculation tank.

11. The water treatment system of claim 10, further comprising a second sedimentation and recirculation tank that removes pollutants from water exiting the second set of filters.

12. The water treatment system of claim 11, further comprising a third set of filters that removes pollutants from water exiting the second sedimentation and recirculation tank.

13. The water treatment system of claim 12, further comprising a backwash system configured to clean at least one of the first set of filters, the second set of filters, and the third set of filters.

14. The water treatment system of claim 13, wherein the backwash system provides concentrated wastewater to the open aeration tank.

15. The water treatment system of claim 9, wherein the electro-coagulation unit includes at least two electro-coagulation units arranged in parallel.

16. The water treatment system of claim 9, further including a conduit to recirculate finished product water to maintain minimum flow through the system.

17. A method for treating wastewater, the method comprising:
providing wastewater to a primary screening tank;
removing large pollutants from the wastewater in the primary screening tank;
providing water from the primary screening tank to a secondary screening tank;
providing water from the secondary screening tank to an electro-coagulation unit;
the electro-coagulation unit generating metal hydroxides in the wastewater;
providing water from the electro-coagulation unit to a third screening tank;
providing water from the third screening tank to a fourth screening tank;
providing water from the fourth screening tank to a first set of filters to remove pollutants from the water; and
providing water from the first set of filters to a fifth screening tank.

18. The method of claim 17, further comprising providing water from the fifth screening tank to a second set of filters to remove pollutants from the water.

19. The method of claim 18, further comprising providing water from the second set of filters to a sixth screening tank.

20. The method of claim 19, further comprising providing water from the sixth screening tank to a third set of filters to remove pollutants from the water.

* * * * *